J. R. PIERCE.
Spring for Horseshoes.

No. 203,074. Patented April 30, 1878.

UNITED STATES PATENT OFFICE.

JOHN R. PIERCE, OF ORFORDVILLE, NEW HAMPSHIRE.

IMPROVEMENT IN SPRINGS FOR HORSESHOES.

Specification forming part of Letters Patent No. 203,074, dated April 30, 1878; application filed March 21, 1878.

*To all whom it may concern:*

Figure 1:
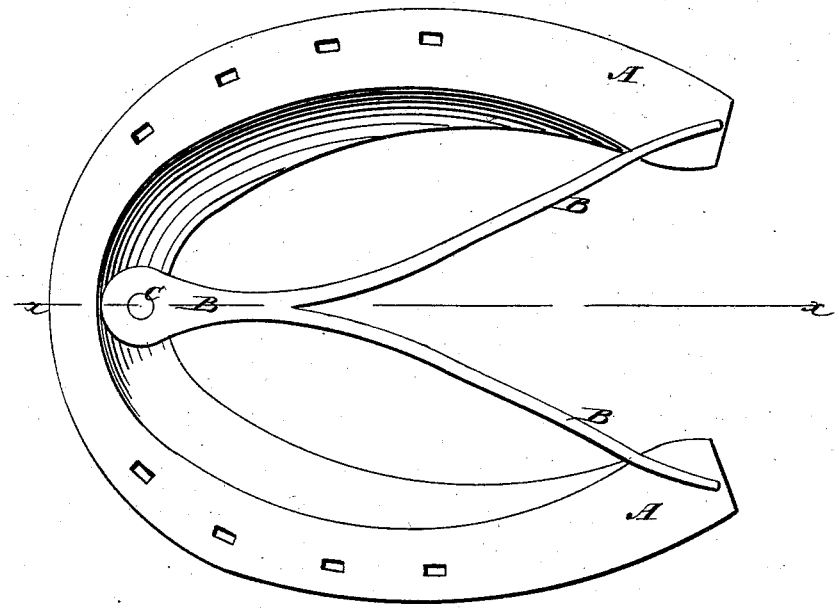
Figure 2:
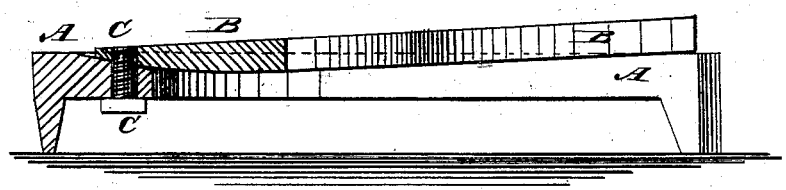

Be it known that I, JOHN RANDOLPH PIERCE, of Orfordville, in the county of Grafton and State of New Hampshire, have invented a new and useful Improvement in Springs for Horseshoes, of which the following is a specification:

Figure 1 is a view of the inner side of a horseshoe to which my improved spring has been applied. Fig. 2 is a longitudinal section of the same, taken through the line $x\ x$, Fig. 1.

Similar letters of reference indicate corresponding parts.

The object of this invention is to furnish an improved spring, which shall be constructed in such a way as to spread the hoof of a horse's foot in a simple, convenient, and effective manner, and without injuring the foot or affecting the attachment of the shoe.

The invention consists in the V-shaped spring, pivoted at its angle to the toe of the shoe, and so formed that its arms may extend back along the sides of the frog and bear against the inner sides of the rim of the hoof, at its heel, as hereinafter fully described.

A represents a horseshoe, which is constructed in the usual way, except that it has a bolt-hole formed through the inner part of its toe. B is a spring, which is made V-shaped, and has a hole formed through its angle to receive the bolt C, that fastens it to the toe of the shoe A. The arms of the spring B extend back in such a direction as to pass along the sides of the frog of the horse's foot, and rest against the inner side of the rim of the hoof, at the heel of said foot.

By this construction the pressure of the spring B will be exerted outward upon the heel of the hoof, so as to spread the hoof in the part where it is liable to contract. When applied to the foot, the rear nail upon the inner side of the foot should be omitted, to give the hoof a better chance to expand.

By this construction there will be no tendency to pry off the shoe, to break out the nails, nor injure the hoof, and at the same time the spring will be so arranged as to be no inconvenience to the horse in traveling.

I am aware that it is not new to combine a spring with two pivoted sections of a horseshoe, so that the former will bear against the latter; but

What I claim is—

A bifurcated spring, having its head secured to and flush with the upper surface of a horseshoe, and rising toward the rear, to clear the shoe and press against the hoof of the animal, as shown and described.

JOHN R. PIERCE.

Witnesses:
 EPHM. B. STRONG,
 BENJN. MORRILL.